(12) United States Patent
Okuyama et al.

(10) Patent No.: US 9,583,749 B2
(45) Date of Patent: Feb. 28, 2017

(54) WORK EQUIPMENT BATTERY CASE AND BATTERY UNIT

(71) Applicant: Komatsu Ltd., Tokyo (JP)

(72) Inventors: Tetsuya Okuyama, Oyama (JP); Takeshi Souma, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/990,493

(22) PCT Filed: Jan. 8, 2013

(86) PCT No.: PCT/JP2013/050124
§ 371 (c)(1),
(2) Date: May 30, 2013

(87) PCT Pub. No.: WO2014/109002
PCT Pub. Date: Jul. 17, 2014

(65) Prior Publication Data
US 2015/0303423 A1   Oct. 22, 2015

(51) Int. Cl.
*B66F 9/075* (2006.01)
*B66F 9/24* (2006.01)
*B60K 1/04* (2006.01)
*B60S 5/06* (2006.01)
(Continued)

(52) U.S. Cl.
CPC ............ *H01M 2/1083* (2013.01); *B60K 1/04* (2013.01); *B66F 9/0754* (2013.01); *B66F 9/07554* (2013.01); *B66F 9/12* (2013.01); *B66F 9/24* (2013.01); *H01M 2/1077* (2013.01); *B60K 2001/0416* (2013.01); *B60K 2001/0466* (2013.01); *B60K 2001/0477* (2013.01); *B60Y 2200/62* (2013.01); *H01M 2220/20* (2013.01); *Y02T 90/124* (2013.01)

(58) Field of Classification Search
CPC ........ B60K 1/04; B66F 9/0754; B66F 9/7531; B66F 9/7572; B66F 9/7536; B60S 5/06
USPC ................................................ 182/68.2, 68.5
See application file for complete search history.

(56) References Cited

U.S. PATENT DOCUMENTS 1,395,992 A * 11/1921 Loudon ............... H01M 2/0245
180/68.5
1,506,837 A * 9/1924 Johnson .................. B60R 16/04
16/423

(Continued)

FOREIGN PATENT DOCUMENTS

| CN | 1622363 A | 6/2005 |
|---|---|---|
| DE | 9312089 U1 | 11/1993 |

(Continued)

OTHER PUBLICATIONS

International Search Report dated Mar. 19, 2013, issued for PCT/JP2013/050124.

*Primary Examiner* — William A Rivera
*Assistant Examiner* — Stefan Kruer
(74) *Attorney, Agent, or Firm* — Locke Lord LLP

(57) ABSTRACT

A work equipment battery case that stores a battery cell for driving a battery powered work equipment, the battery case includes: a plate-like bottom on which the battery cell is placed; and a plate-like side formed to project from the bottom, and arranged at an outside of the battery cell placed on the bottom, wherein a mass of a part of the side is larger than a mass of the other part of the side.

12 Claims, 12 Drawing Sheets

(51) Int. Cl.
*H01M 2/10* (2006.01)
*B66F 9/12* (2006.01)

(56) References Cited

U.S. PATENT DOCUMENTS

| | | | | |
|---|---|---|---|---|
| 3,721,353 | A * | 3/1973 | Erickson | B60K 1/04 180/68.5 |
| 4,109,064 | A * | 8/1978 | Warner | H01M 2/10 180/68.5 |
| 4,252,206 | A * | 2/1981 | Burkholder | B60K 1/04 180/68.5 |
| 4,312,418 | A * | 1/1982 | Rittman | B60L 11/1877 180/69.21 |
| 6,189,636 | B1 | 2/2001 | Kikukawa | |
| 6,632,560 | B1 * | 10/2003 | Zhou | H01M 2/1083 180/68.5 |
| 8,789,636 | B2 | 7/2014 | Nishiyama et al. | |
| 2005/0136325 | A1 | 6/2005 | Fujihara et al. | |
| 2008/0006459 | A1 * | 1/2008 | Niebuhr | B60K 1/04 180/68.5 |
| 2008/0011553 | A1 | 1/2008 | Mielke | |
| 2009/0283346 | A1 * | 11/2009 | Katae | B60K 1/04 180/68.2 |
| 2009/0314557 | A1 | 12/2009 | Takeuchi et al. | |
| 2010/0147612 | A1 * | 6/2010 | Murase | B60K 1/04 180/68.5 |
| 2011/0143179 | A1 * | 6/2011 | Nakamori | B60K 1/04 429/99 |
| 2014/0020967 | A1 | 1/2014 | Nishiyama et al. | |

FOREIGN PATENT DOCUMENTS

| | | | |
|---|---|---|---|
| DE | 29706843 U1 | 6/1997 | |
| DE | 102006030770 A1 | 1/2008 | |
| DE | 112012000063 T5 | 8/2013 | |
| JP | 58211918 A * | 12/1983 | B60K 1/04 |
| JP | 04-237633 A | 8/1992 | |
| JP | 09-144062 A | 6/1997 | |
| JP | 11-021948 A | 1/1999 | |
| JP | 11-222390 | 8/1999 | |
| JP | 2001-316092 A | 11/2001 | |
| JP | 2003-007257 A | 1/2003 | |
| JP | 2007-211394 A | 8/2007 | |
| JP | 2013-239261 A | 11/2013 | |
| WO | WO-2012/137582 A1 | 10/2012 | |

* cited by examiner

WORK EQUIPMENT BATTERY CASE AND BATTERY UNIT

FIELD

The present invention relates to a work equipment battery case and a work equipment battery unit, which are used for a battery powered work equipment operating with a battery mounted on a body, and a battery powered work equipment and a battery powered forklift including the work equipment battery case and the work equipment battery unit.

BACKGROUND

As a battery powered work equipment, there has been known a forklift that loads and unloads cargo and moves the cargo by using a fork mounted on the front part of the body of the machine. The forklift described above travels and performs a cargo handling operation with a battery mounted on the body. The battery is mounted on the work equipment with the state in which plural battery cells are stored in a battery case (see, for example, Patent Literature 1).

CITATION LIST

Patent Literature

Patent Literature 1: Unexamined Japanese Patent No. 2001-316092

SUMMARY

Technical Problem

The battery powered work equipment sometimes uses a battery having different capacity, according to specification, in order to respond to a change in the specification due to an operating time or various works. For example, there may be the case in which a battery having different capacity is mounted on a work equipment of the same type upon the factory shipment, or a battery is exchanged to a battery having different capacity according to an actual work. When the battery powered work equipment is configured to be capable of employing a battery of different capacity, it is considered that the battery case is formed to be compatible in such a manner that the size of the outer dimension of the battery case is set to be the same for the batteries each having different capacity.

When the capacity of the battery is different, the mass and the mass balance of the whole battery including plural battery cells are different. Therefore, when the battery having different capacity is mounted on the same battery powered work equipment, the balance of the mass of the whole work equipment might be affected. On the other hand, there is a demand that the increase in the number of the components of the battery is prevented.

The present invention aims to reduce an affect given to the balance of the mass of the whole battery powered work equipment, while reducing an increase in the number of components, when a battery having different capacity is used for the battery powered work equipment.

Solution to Problem

According to the present invention, a work equipment battery case that stores a battery cell for driving a battery powered work equipment, the battery case comprises: a plate-like bottom on which the battery cell is placed; and a plate-like side formed to project from the bottom, and arranged at an outside of the battery cell placed on the bottom, wherein a mass of a part of the side is larger than a mass of the other part of the side In the present invention, it is preferable that the battery case comprises plural storage sections each of which stores the battery cell, and the plural storage sections are arranged to be close to the part of the side.

In the present invention, it is preferable that a thickness of the part of the side is larger than that of the other part.

In the present invention, it is preferable that plural lifting hooks are mounted on a side to be close to the part of the side.

According to the present invention, a work equipment battery unit that drives a battery powered work equipment, the battery unit comprises: a battery cell; and a battery case, wherein the battery case includes a plate-like bottom on which the battery cell is placed and a plate-like side formed to project from the bottom, and arranged at an outside of the battery cell placed on the bottom, a mass of a part of the side is larger than a mass of the other part of the side, and the battery cell is arranged to be close to the part of the side whose mass is larger than that of the other part.

In the present invention, it is preferable that a thickness of the part of the side is larger than that of the other part.

In the present invention, it is preferable that plural lifting hooks are mounted on a side to be close to the part of the side.

According to the present invention, a battery powered work equipment comprises the work equipment battery unit.

According to the present invention, a battery powered forklift comprises a fork mounted on a front of a body, a counter weight mounted on a rear of the body, and a top plate arranged on a position for covering a portion above a driver seat via a pair of rear stays extending upward from both rear sides of the body, the battery powered forklift being driven by electric power from a battery mounted on the body, wherein a battery case is mounted on the body on a position above a rear wheel so as to be capable of being unloaded toward the rear of the body, the battery case including a battery cell, a plate-like bottom on which the battery cell is placed, and a plate-like side that projects from the bottom and that is arranged at an outside of the battery placed on the bottom, the side having a part whose mass is larger than that of the other part of the side, and the battery cell being arranged to be close to the part of the side whose mass is larger than that of the other part.

In the present invention, it is preferable that a thickness of the part of the side is larger than that of the other part.

In the present invention, it is preferable that plural lifting hooks are mounted on a side to be close to the part of the side.

In the present invention, it is preferable that the top plate has a slit which is formed along a longitudinal direction of the body, and opens to a rear end.

Advantageous Effects of Invention

When a battery having different capacity is used for a battery powered work equipment, the present invention can reduce an affect given to the balance of the mass of the whole battery powered work equipment, while reducing an increase in the number of components.

DESCRIPTION OF EMBODIMENTS

The embodiments of the present invention will be described in detail with reference to the drawings.

Figure 1:
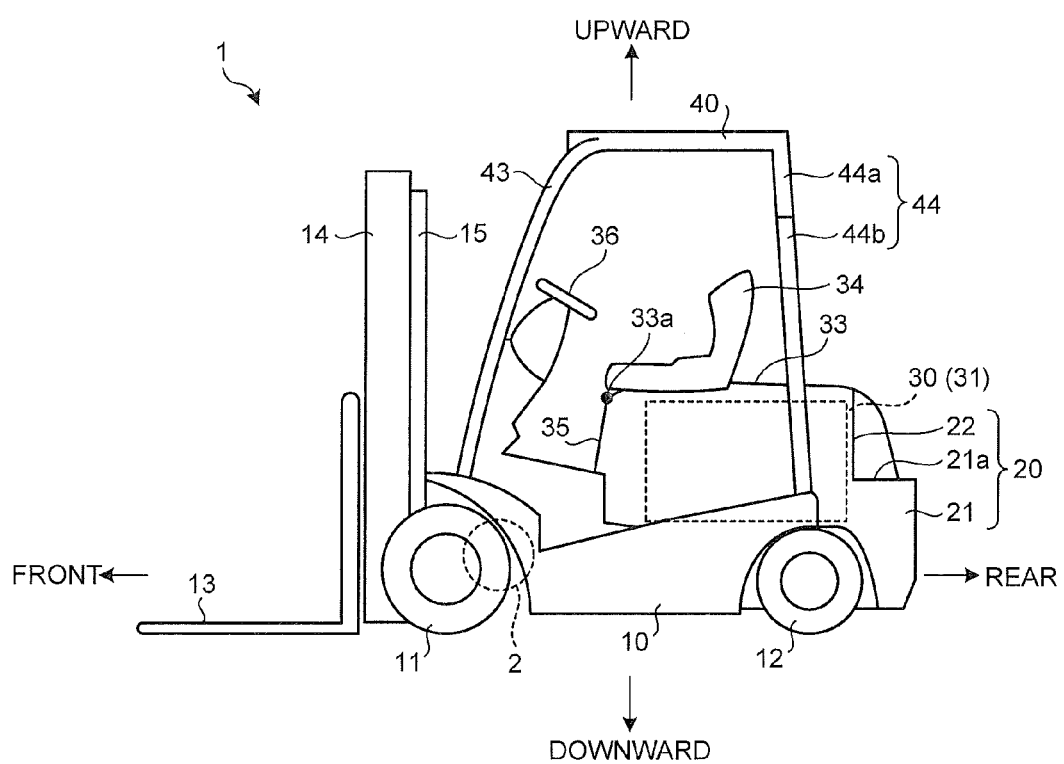
FIG. 1 is a side view illustrating a work equipment according to an embodiment of the present invention.
Figure 2:
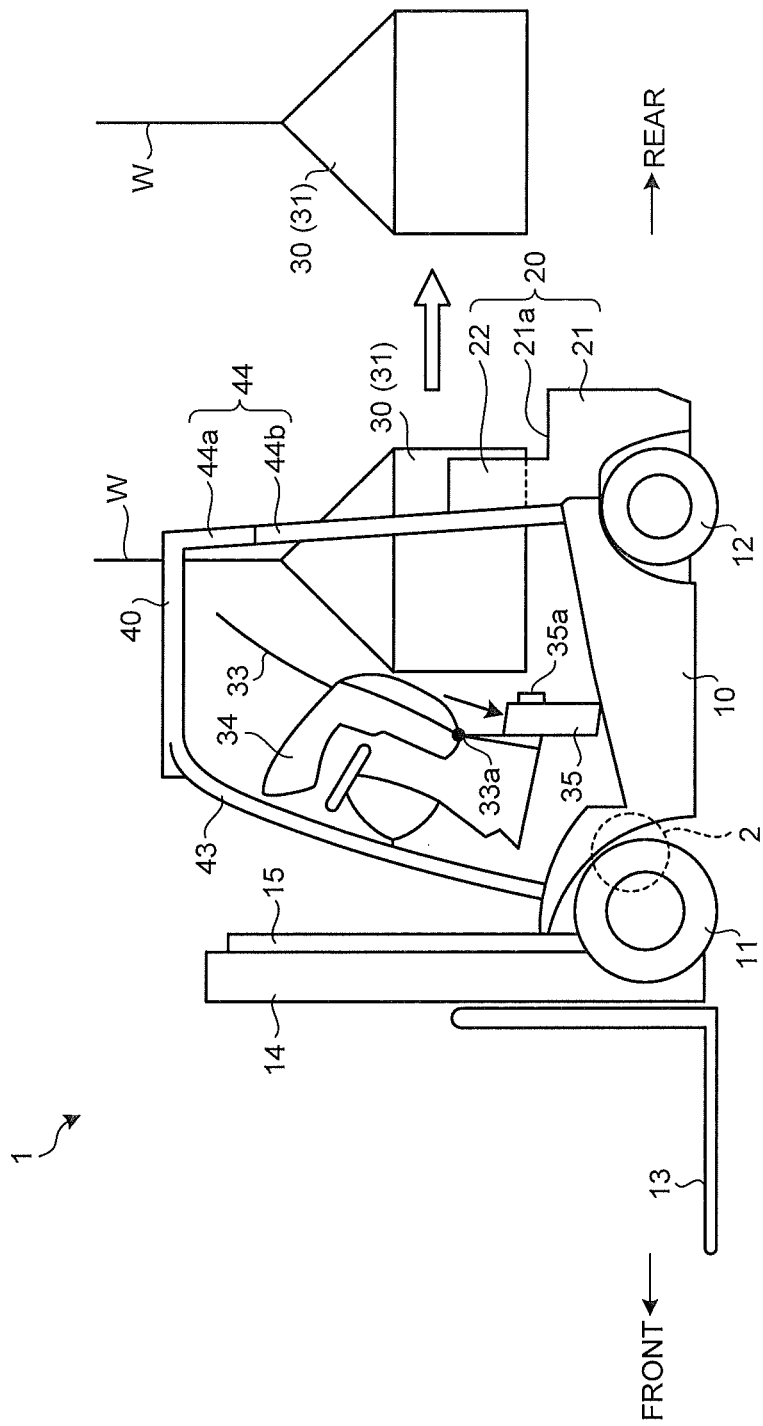
FIG. 2 is a side view illustrating the work equipment according to the embodiment of the present invention.
Figure 3:
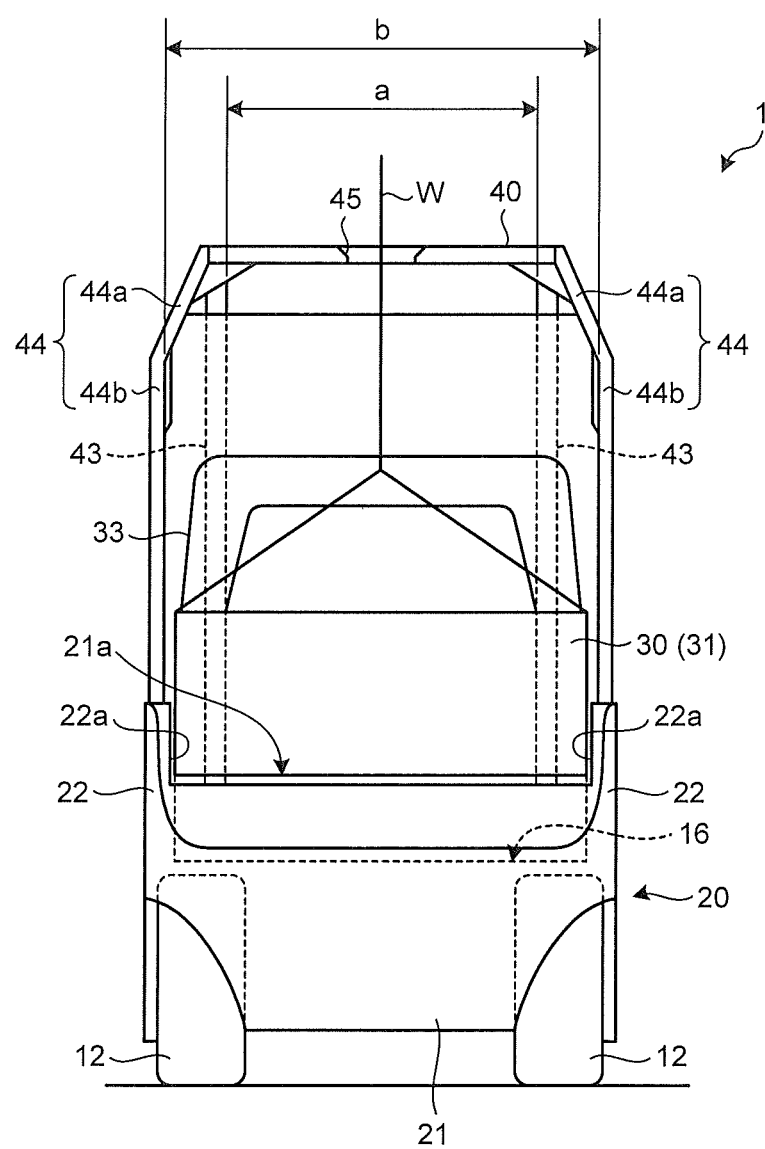
FIG. 3 is a rear front view illustrating the work equipment according to the embodiment of the present invention.
Figure 4:
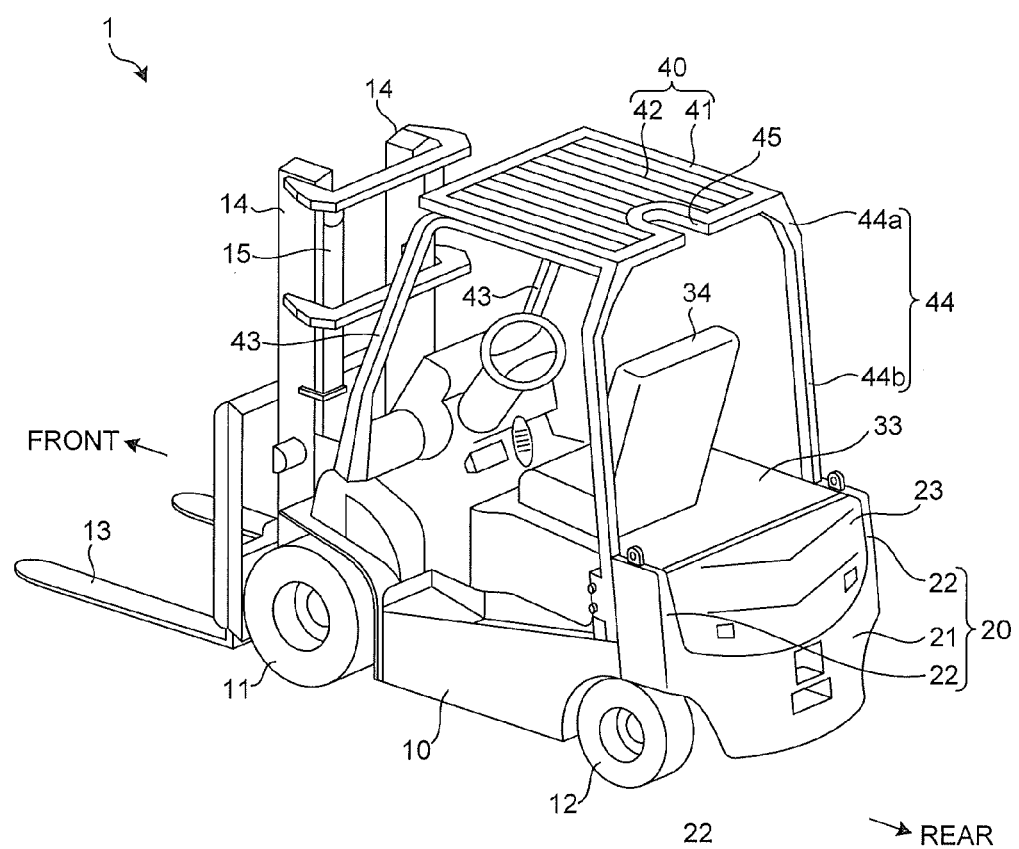
FIG. 4 is a perspective view illustrating the work equipment according to the embodiment of the present invention.
Figure 5:
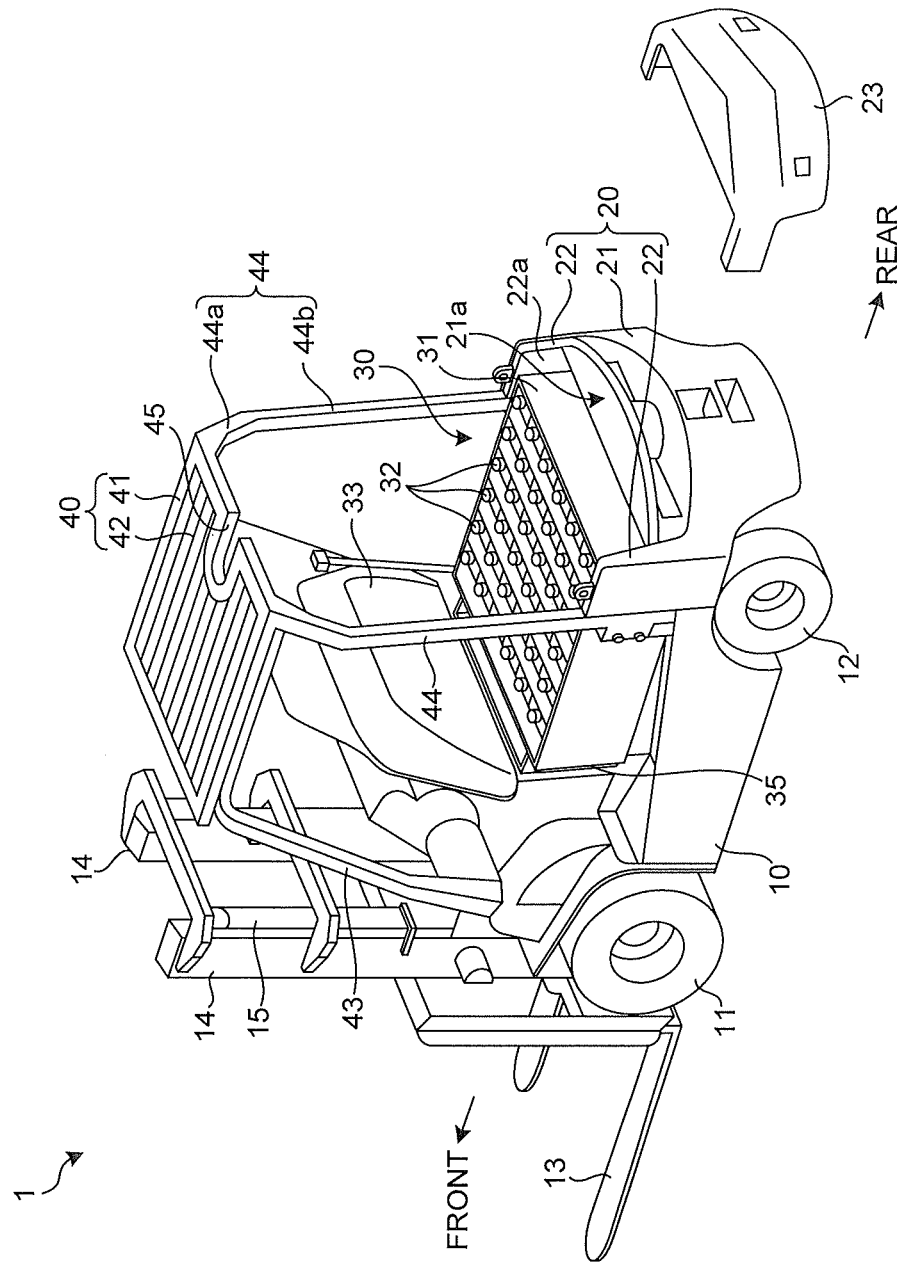
FIG. 5 is a perspective view of the work equipment as viewed from rear, wherein a battery food tilts to expose a battery in the work equipment illustrated in FIG. 1.
Figure 6:
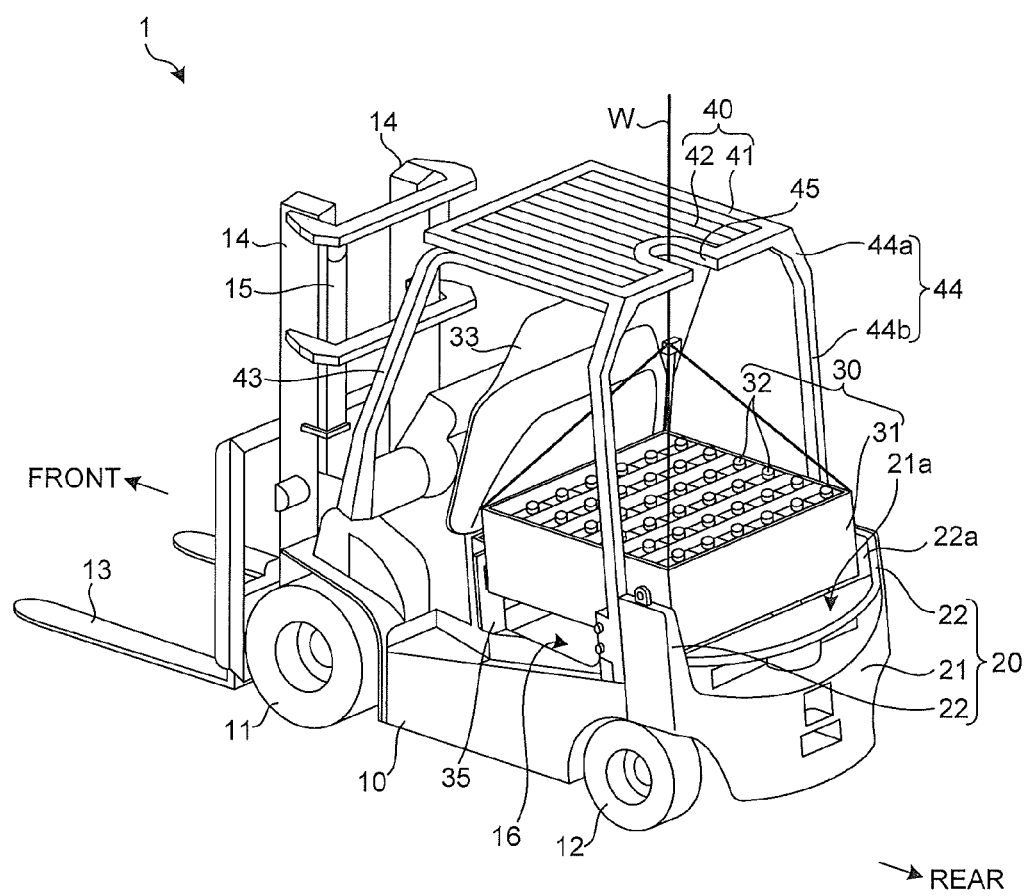
FIG. 6 is a perspective view illustrating the work equipment illustrated in FIG. 1 as viewed from rear, wherein the battery is lifted up.
Figure 7:
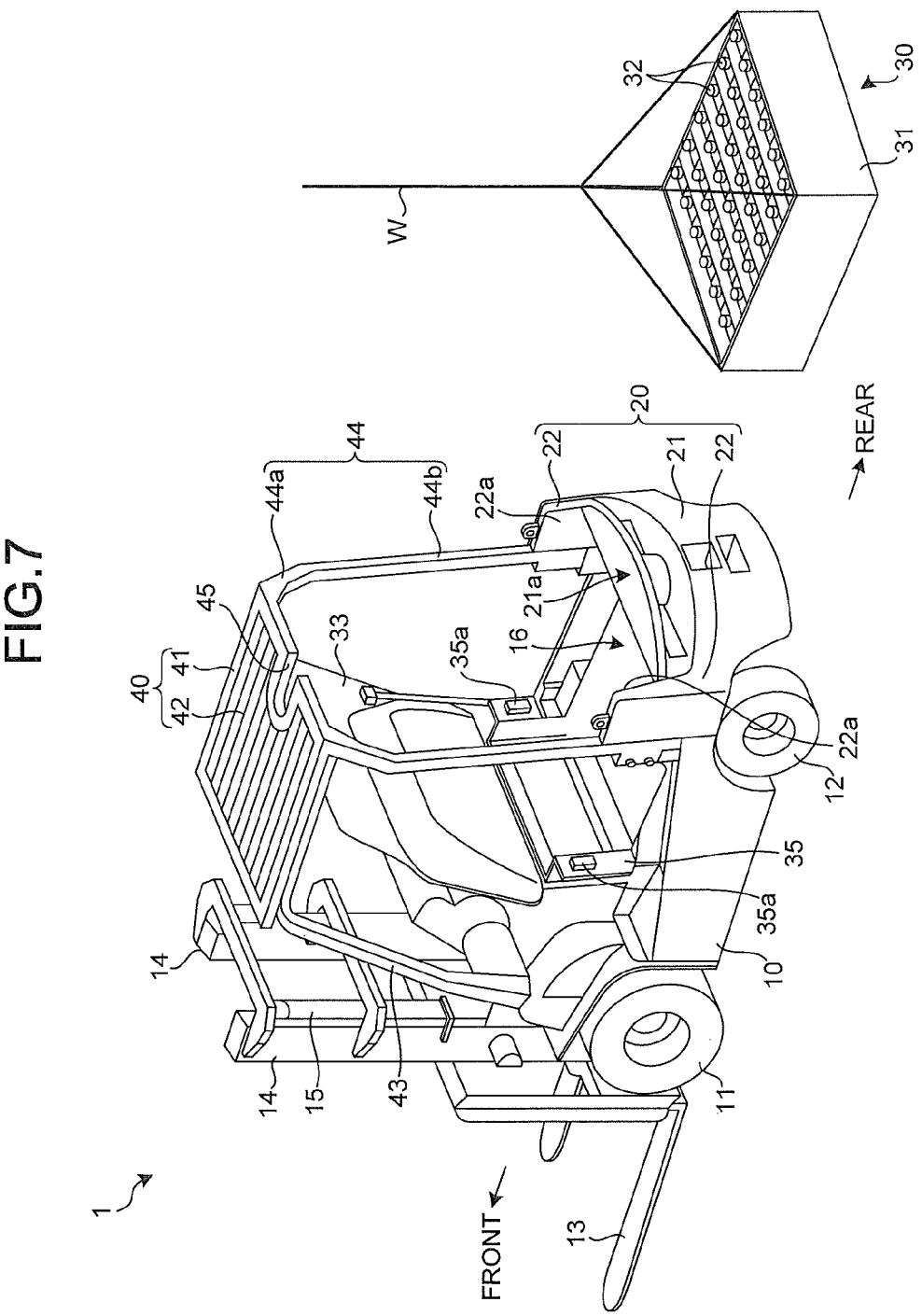
FIG. 7 is a perspective view illustrating the work equipment illustrated in FIG. 1 as viewed from rear, wherein the battery is extracted to the rear.

FIGS. 1 and 2 are side views illustrating a work equipment according to the embodiment of the present invention. FIG. 3 is a rear front view illustrating the work equipment according to the embodiment of the present invention. FIG. 4 is a perspective view illustrating the work equipment according to the embodiment of the present invention. FIG. 5 is a perspective view of the work equipment as viewed from rear, wherein a battery food tilts to expose a battery in the work equipment illustrated in FIG. 1. FIG. 6 is a perspective view illustrating the work equipment illustrated in FIG. 1 as viewed from rear, wherein the battery is lifted up. FIG. 7 is a perspective view illustrating the work equipment illustrated in FIG. 1 as viewed from rear, wherein the battery is extracted to the rear. In the present embodiment, the work equipment is a battery powered work equipment. A battery powered forklift 1 will be described below as the work equipment. However, the work equipment is not limited thereto. For example, the work equipment may be a wheel loader or an excavator that is driven by power from a battery or power supplied from a generator driven by an engine or the like.

In the description below, the battery powered forklift 1 has the side where a fork 13 is mounted is a front side and the side where a counter weight 20 is provided is a rear side. When the work equipment is not the battery powered forklift, the direction toward a steering wheel 36 serving as an operation device from a driver seat 34 is a front direction, while the direction toward the driver seat 34 from the steering wheel 36 is a rear direction. The operation device includes not only the steering wheel 36 used for steering the work equipment, but also an operation lever for operating the work equipment in an excavator or a wheel loader and the like.

In the present embodiment, right and left are supposed to mean right and left with respect to the front. The lateral direction is a widthwise direction of a body 10 serving as a body of the work equipment. The upward direction is a direction orthogonal to a plane (contact plane) that is in contact with at least three of front wheels 11 and rear wheels 12, and directing toward the rotation center shaft of the front wheel 11 and the rear wheel 12 from the contact plane. The downward direction is a direction toward the contact plane from the rotation center shaft of the front wheel 11 and the rear wheel 12. The axis in the longitudinal direction of the body 10, and passing through the center of the widthwise direction of the body 10 is referred to as a longitudinal axis, and an axis orthogonal to the longitudinal axis, and in the lateral direction of the body 10 is referred to as a lateral axis. The axis in the vertical direction of the body 10 is referred to as a vertical axis. The vertical axis is orthogonal to both the longitudinal axis and the lateral axis. In the description below, a planar view is supposed to be viewed from above.

<Overall Structure of Battery Powered Forklift 1>

The battery powered forklift 1 has front wheels 11 on front corners of the body 10, and rear wheels 12 on rear corners of the body 10. The battery powered forklift 1 travels, when a driving electric motor 2 drives the front wheels 11.

The fork 13 is provided on the front of the body 10 in order to load and unload a cargo and move the cargo. The fork 13 is supported by a mast 14 provided along the vertical direction. The fork 13 moves up and down along the mast 14 by a drive of a mast cylinder 15 provided with the mast 14. Although not clearly illustrated in the figure, the mast 14 is mounted on the body 10 so as to be capable of swinging about a horizontal axis along the lateral direction of the body 10, i.e., the widthwise direction, on its lower end. The mast 14 has a tilt cylinder, not illustrated, with the body 10, and the mast 14 can take a forward tilting posture and a backward tilting posture with respect to the body 10 by the drive of the tilt cylinder.

A counter weight 20 is provided on the rear end of the body 10. As described above, the battery powered forklift 1 is a counter balance forklift in the present embodiment. However, the type of the battery powered forklift 1 is not limited thereto, and it may be a reach forklift, for example. The counter weight 20 is a metal weight for keeping the balance when the fork 13 holds the cargo. The counter weight 20 is provided on the portion of the body 10 ranging from the portion above the rear wheel 12 to the rear end.

As apparent from FIG. 3, the counter weight 20 has a concave portion, open in the longitudinal direction, on the top surface. Specifically, the counter weight 20 having the concave portion on its top surface is configured such that a pair of columnar members 22 is formed to project upward on both sides of a weight body 21 having a flat top surface. The columnar members 22 are projecting portions projecting upward and to the front of the body 10 from the portions, opposite to each other, on both sides of the weight body 21, and having guide surfaces 22a that are parallel to each other along the longitudinal direction of the body 10. The columnar member 22 is formed to be integral with the weight body 21. FIGS. 4 and 5 illustrate a resin weight cover 23 that covers the back surface of the counter weight 20.

As illustrated in FIGS. 1, 2, and 5, a battery 30 serving as a power supply is mounted on the central part of the body 10.

The battery 30 is configured to include plural battery cells 32 stored in a battery case 31 serving as a work equipment battery case. The battery case 31 is used for a battery powered work equipment, for example, for the battery powered forklift 1, and it is a structure having a rectangular solid shape with the top surface open.

As illustrated in FIG. 3, the battery case 31 is formed such that the size along the lateral direction of the body 10 is set to be slightly smaller than the distance between the guide surfaces 22a formed on the respective columnar members 22, whereby the battery case 31 can pass between the columnar members 22. As illustrated in FIGS. 1, 2, 5, and 7, the battery 30 is placed onto a battery mounting surface 16 (FIG. 7) formed on the body 10 to be anterior to the front surface of the weight body 21 and below a top surface 21a of the weight body 21. The battery mounting surface 16 is set such that, when the battery 30 is placed on the top surface of the battery mounting surface 16, the upper part of the battery 30 on the rear end is present between the columnar members 22, and is overlapped with the counter weight 20.

A battery hood 33 is provided above the battery 30 placed onto the battery mounting surface 16. A driver seat 34 is provided on the top surface of the battery hood 33. The battery hood 33 is large enough to cover the top surface of the battery case 31. The battery hood 33 is supported to a support bracket 35 of the body 10 on its front end via a support shaft 33a along the lateral direction of the body 10. The battery hood 33 is movable by the rotation about the support shaft 33a between a horizontal position where the battery hood 33 covers the battery 30 from above as illustrated in FIG. 1 and a forward tilting position where the rear end of the battery hood is flipped up to open the upper part of the battery 30 as illustrated in FIG. 2. When the battery hood 33 is moved to the forward tilting position, the battery 30 can be lifted up to the position (hereinafter referred to as "battery transfer position") where the bottom surface of the battery case 31 is slightly above the top surface 21a of the weight body 21 without entailing interference between the battery hood 33 and the battery case 31, as illustrated in FIGS. 2 and 6.

As illustrated in FIGS. 2, 6, and 7, the support bracket 35 supporting the battery hood 33 is formed to project upward from the position on the front end of the battery mounting surface 16, and a cushion material 35a is formed on the surface directing to the rear of the body 10. The cushion material 35a is formed from an elastic material, such as a rubber, to have a rectangular solid shape, and it is applied such that the longitudinal direction thereof is along the vertical direction. The cushion material 35a is formed to have the longitudinal side along the vertical direction in order that, when the battery 30 is placed onto the battery mounting surface 16, it is brought into contact with the upper part of the front surface of the battery case 31, and even when the battery 30 is lifted up to the battery transfer position, it can be brought into contact with the front surface of the battery case 31.

As illustrated in FIGS. 1 to 4, a top plate 40 is provided above the body 10. The top plate 40 has plural bars 42 arranged on almost a rectangular frame body 41 with a size for covering the driver seat 34 from above. The size of the top plate 40 along the lateral direction of the body 10 is smaller than the body 10. The top plate 40 is mounted on the body 10 via a pair of front stays 43 and a pair of rear stays 44.

As illustrated in FIGS. 1 and 3, the front stays 43 extend downward from the front corner of the top plate 40 so as to tilt forward, and each lower end is fixed to the front end of the body 10. The distance (a in FIG. 3) between the front stays 43 is equal along the entire length.

On the other hand, each of the rear stays 44 has an expanding portion 44a that linearly projects downward from the rear corner of the top plate 40, the expanding portions 44a being formed to separate from each other toward the side, and a stay body 44b that extends downward in the vertical direction from the lower end of the expanding portion 44a and is fixed to the rear end of the body 10 on its lower end. The distance (b in FIG. 3) between the stay bodies 44b, parallel to each other, of the rear stays 44 is almost the same as the distance between the guide surfaces 22a formed on the columnar members 22, whereby the battery case 31 and the battery hood 33 can pass between the stay bodies. The position where the stay body 44b and expanding portion 44a cross each other is set as high as possible in order not to interfere with the rear stay 44 even when the battery hood 33 on the horizontal position is moved to the forward tilting position, and in order not to interfere with the battery case 31 even when the battery 30 is moved to the battery transfer position.

As illustrated in FIG. 5, the top plate 40 has a slit 45. The slit 45 is formed toward the front from the rear end of the top plate 40 along the longitudinal direction of the body 10, and is formed such that the front end is located anterior to the midpoint of the size of the battery 30 in the longitudinal direction.

The battery powered forklift 1 performs a cargo handling operation with the state in which the battery 30 placed onto the battery mounting surface 16 is covered by the battery hood 33, and the back surface of the counter weight 20 is covered by the weight cover 23. Specifically, the operator seated on the driver seat 34 operates to drive the battery powered forklift 1 with the front wheels 11 driven by the driving electric motor 2 illustrated in FIGS. 1 and 2, and moves the fork 13 up and down, as needed, thereby being capable of carrying out the desired cargo handling operation.

In the battery powered forklift 1, the battery 30 is mounted on the body 10 in such a manner that a part of the battery 30 is located rearward beyond the rear stays 44 supporting the top plate 40, and overlapped with the counter weight 20. Accordingly, the mass of the battery 30 effectively functions as the balance weight, so that the mass of the counter weight 20 can significantly be reduced. As a result, the mass of the body 10 is reduced, whereby energy saving, such as reduction in power consumption of the battery 30, can be realized.

Since the battery 30 is mounted on the position above the rear wheels 12 in the battery powered forklift 1, the size of the battery 30 in the lateral direction can be secured to be large. Accordingly, even when the battery 30 having the same mass is mounted, the size of the battery 30 in the longitudinal direction becomes small, whereby the battery 30 can be arranged more to the rear of the body 10. Consequently, the battery 30 can more effectively be used as the balance weight.

The concave portion through which the battery case 31 can pass in the longitudinal direction is formed on the top surface of the counter weight 20, and the distance between the rear stays 44 supporting the top plate 40 is formed to have the size by which the battery case 31 can pass. The top plate 40 extends along the longitudinal direction, and has the slit 45 open to the rear end. Therefore, when the weight cover 23 is removed, and the battery hood 33 is moved to the forward tilting position as illustrated in FIG. 5, and as illustrated in FIG. 6, the battery 30 is lifted up by a wire W from this state, the battery 30 can be lifted up to the battery transfer position. When the battery 30 is moved parallel to the rear as illustrated in FIG. 7, the battery 30 can be unloaded from the body 10. When the battery 30 is mounted on the body 10, the reverse operation may be executed.

The rear stay 44 arranged at the side of the body 10 does not hinder the movement of the battery 30 in the longitudinal direction of the body 10, so that the additional operation such as attaching or detaching the rear stay 44 is not needed. Accordingly, the possibility of deteriorating the workability upon loading and unloading the battery 30 can be reduced. Since the columnar members 22 are provided on both sides of the top surface 21a of the weight body 21 of the counter weight 20, the guide surfaces 22a formed on the respective columnar members 22 function as a guide for moving the battery 30 in the longitudinal direction of the body 10. Accordingly, this structure can reduce the possibility of collision of the battery 30 against another member due to the swing of the battery 30. Similarly, since the cushion material 35a is provided on the support bracket 35 supporting the battery hood 33, the cushion material 35a can absorb impact of the collision, even when the battery case 31 collides against the support bracket 35 upon mounting the battery 30. The battery case 31 storing plural battery cells 32 will next be described.

<Battery Case>

Figure 8:
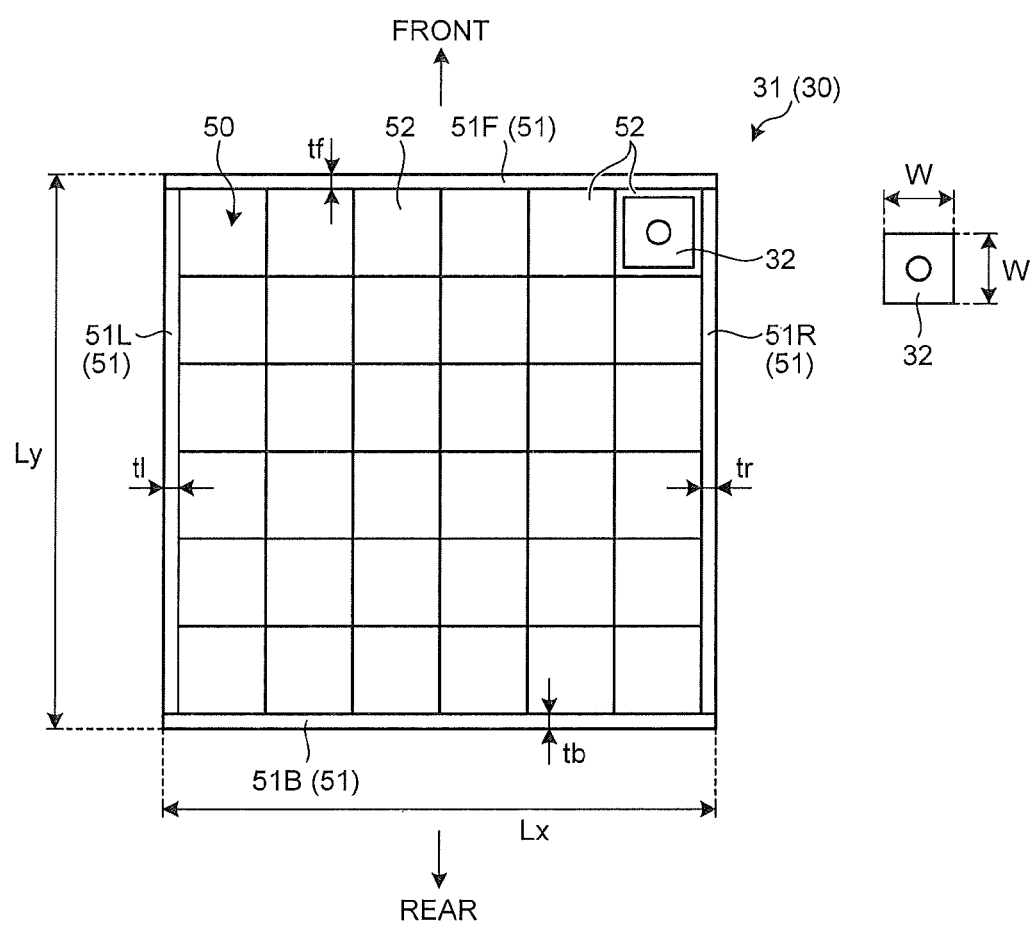
FIG. 8 is a plan view illustrating a battery case and battery cells stored in the battery case according to the embodiment of the present invention.
Figure 9:
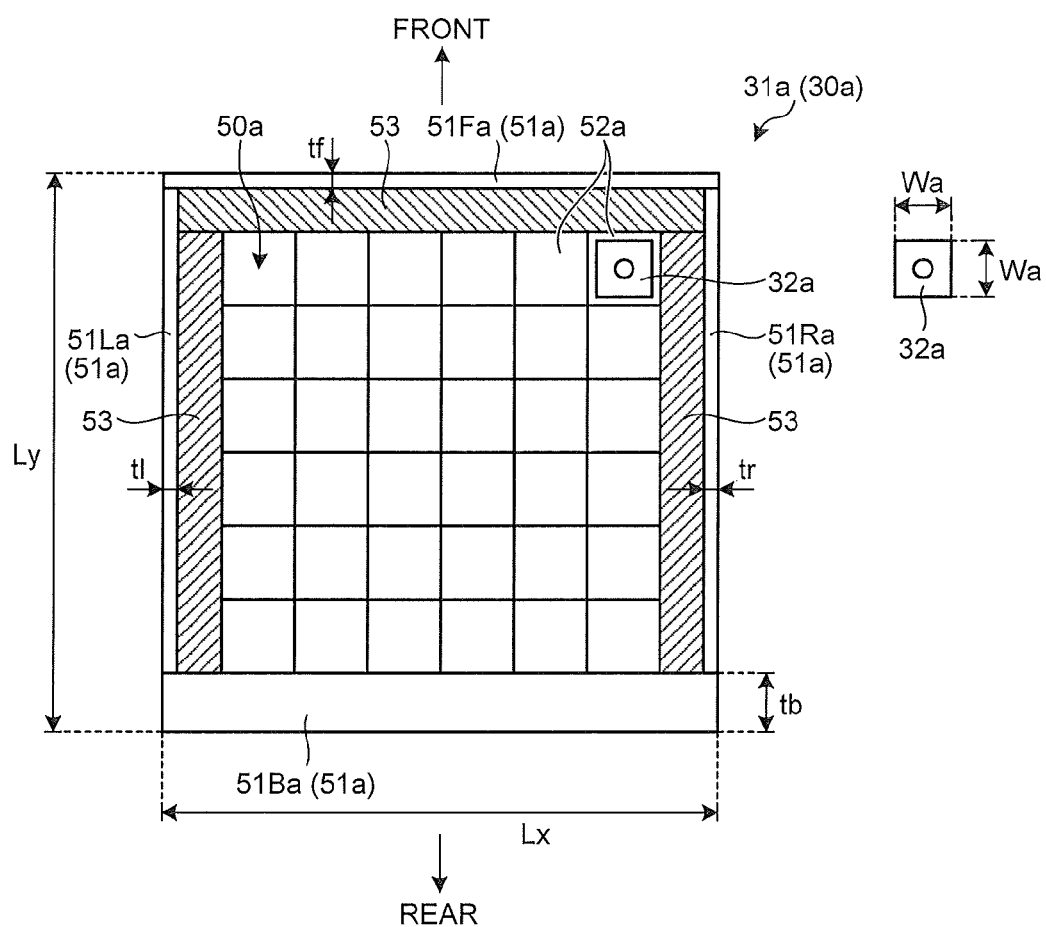
FIG. 9 is a plan view illustrating the battery case and battery cells stored in the battery case according to the embodiment of the present invention.
Figure 10:
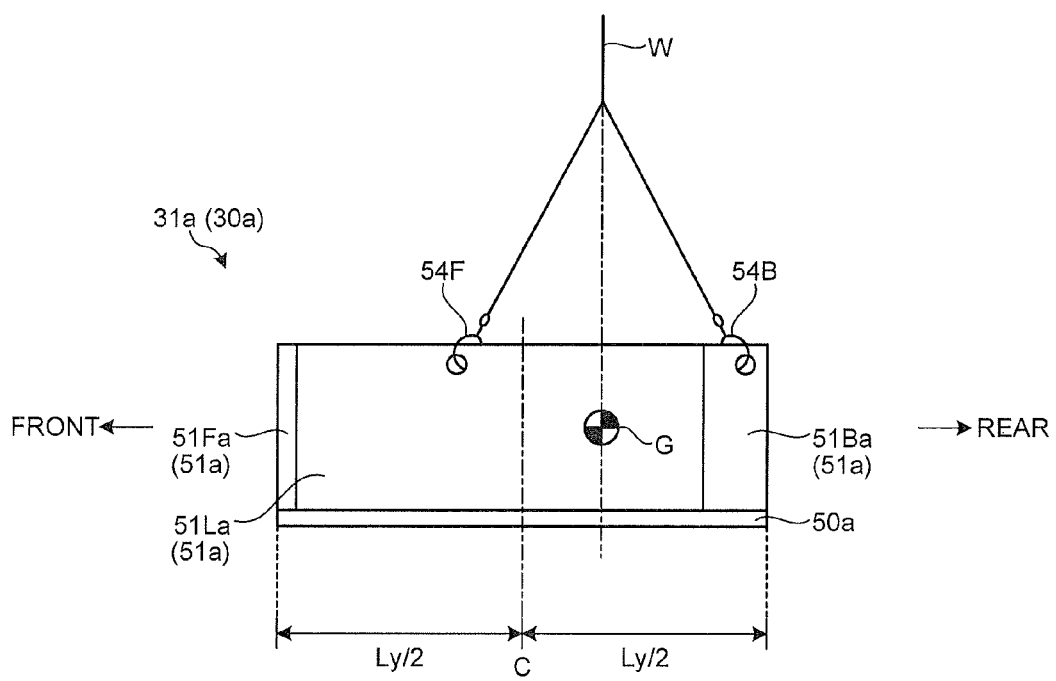
FIG. 10 is a side view illustrating the battery case illustrated in FIG. 9.
Figure 11:
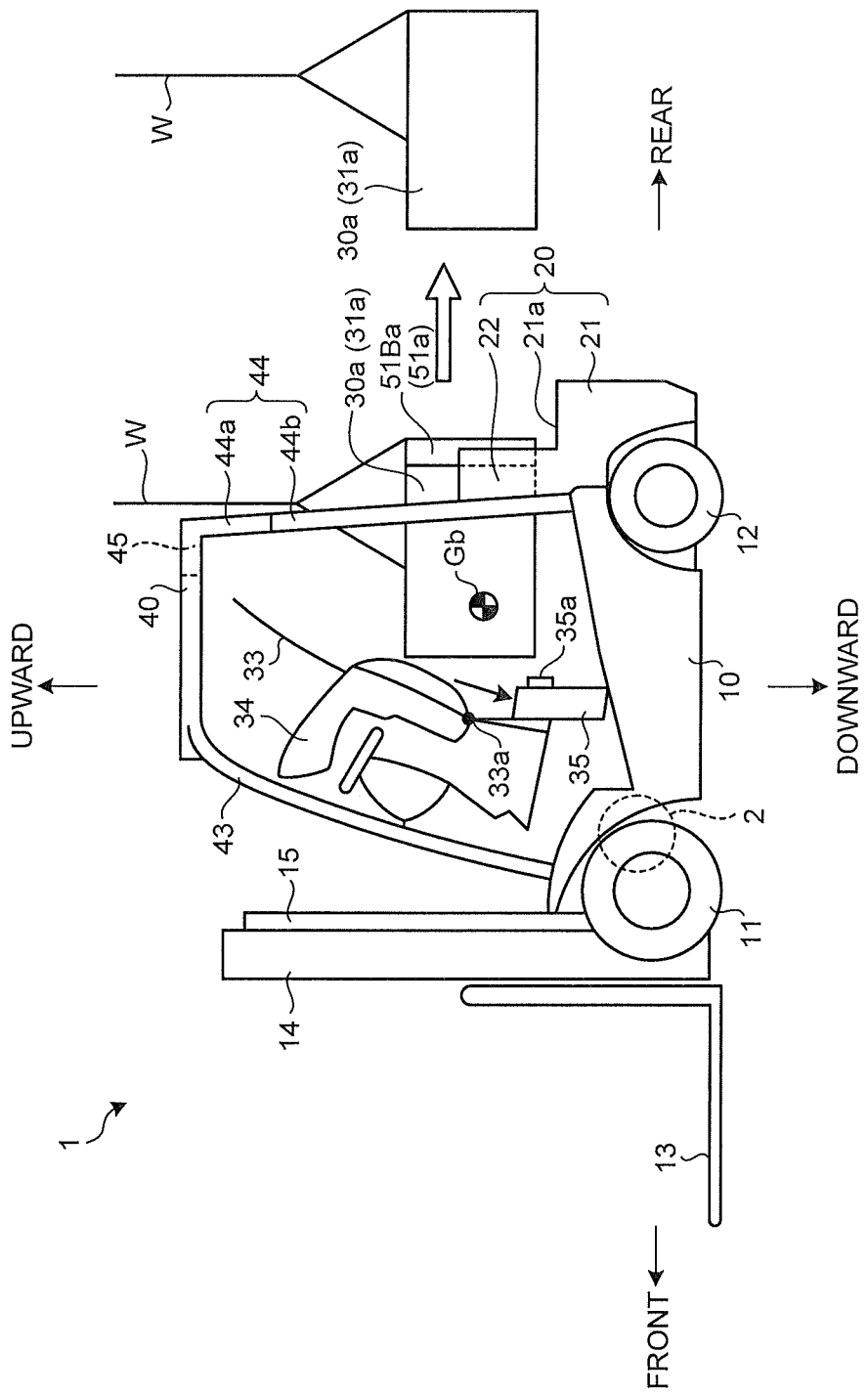
FIG. 11 is a view illustrating the relationship between a small-capacity battery and a battery powered forklift.

FIGS. 8 and 9 are plan views of the battery case and the battery cells stored in the battery case according to the present embodiment. FIG. 10 is a side view of the battery case illustrated in FIG. 9. FIG. 11 is a view illustrating the relationship between a small-capacity battery and a battery powered forklift. The battery powered forklift 1 sometimes uses the battery 30 having different capacity, according to specification, in order to respond to a change in the specification due to an operating time or various cargo handling operations. The battery 30 secures required voltage by connecting plural battery cells 32 in series, for example. The battery 30 having different capacity can be prepared by making the capacity of each battery cell 32 different.

A battery cell 32a illustrated in FIG. 9 has capacity smaller than that of the battery cell 32 in FIG. 8. The battery cell 32 in FIG. 8 and the battery cell 32a in FIG. 9 have a square shape, and the same height in the planar view, but the lengths W and Wa of one side of the square are different in the planar view. Specifically, the length of one side of the battery cell 32 is W, while the length of one side of the battery cell 32a is Wa that is smaller than W (W>Wa). Since the specification other than the size in the planar view is the same in the battery cells 32 and 32a, the capacity of the battery cell 32a is smaller than the capacity of the battery cell 32.

Therefore, the capacity of a battery 30a that is used as the work equipment battery unit and that is formed by storing plural battery cells 32a in FIG. 9 in the battery case 31a used as the work equipment battery case is smaller than the capacity of the battery 30 that is used as the work equipment battery unit and that is formed by storing plural battery cells 32 in FIG. 8 in the battery case 31 used as the work equipment battery case. In the description below, the battery 30 having relatively large capacity is referred to as a normal battery, while the battery 30a having relatively small capacity is referred to as a small-capacity battery.

In the normal battery 30 and the small-capacity battery 30a, the normal battery case 31 and the small-capacity battery case 31a have the same outer dimension in order to be compatible with the same battery powered forklift 1. The battery cases 31 and 31a have a rectangular shape (including a square) in the planar view, i.e., as viewed from the side where the battery cells 32 and 32a are inserted. The size of the battery cases 31 and 31a in the longitudinal direction is Ly, while the size in the direction orthogonal to the longitudinal direction, i.e., in the lateral direction, is Lx. In the present embodiment, Ly=Lx. Therefore, the battery cases 31 and 31a have the square shape in the planar view.

The battery cases 31 and 31a include plate-like bottoms 50 and 50a on which the battery cells 32 and 32a are placed, and plate-like sides 51 and 51a that project from the bottoms 50 and 50a and that are arranged at the outside of the battery cells 32 and 32a placed on the bottoms 50 and 50a. In the present embodiment, the bottoms 50 and 50a made of a plate-like member have a rectangular shape, more specifically a square shape, as viewed from the direction orthogonal to the plate surface. The sides 51 and 51a are plate-like members provided on four sides of the bottom 50. In the description below, when the battery is mounted on the battery powered forklift 1, the sides 51 and 51a formed on the front are referred to as front sides 51F and 51Fa, the sides 51 and 51a formed on the back are referred to as back sides 51B and 51Ba, the sides 51 and 51a formed on the left are referred to as left sides 51L and 51La, and the sides 51 and 51a formed on the right are referred to as right sides 51R and 51Ra.

The space in the battery cases 31 and 31a enclosed by the sides 51 and 51a and the bottoms 50 and 50a is divided into plural storage sections 52 and 52a. The battery cells 32 and 32a are stored in the storage sections 52 and 52a. Since the outer dimension of the battery cell 32 and the outer dimension of the battery cell 32a are different in the planar view, the size of the storage section 52 and the size of the storage section 52a are also different in the planar view. Specifically, the size of the storage section 52a in the small-capacity battery is smaller than the size of the storage section 52 in the normal battery in the planar view. The number of the battery cells 32 and 32a stored in the battery cases 31 and 31a is the same for the normal battery 30 and the small-capacity battery 30a. Accordingly, as illustrated in FIG. 8, a gap is not formed between the plural storage sections 52 and the side 51 in the battery case 31 of the normal battery, while a gap is formed between the plural storage sections 52 and the side 51a in the battery case 31a of the small-capacity battery as illustrated in FIG. 9. In order to fill the gap, a spacer 53 is provided between the plural storage sections 52 and each of the sides 51a in the small-capacity battery 30a as illustrated in FIG. 9. This structure can establish compatibility between the normal battery 30 and the small-capacity battery 30a.

In the present embodiment, the battery 30 having a large mass functions as a part of the counter weight 20 in the battery powered forklift 1. Accordingly, the battery case 31 is mounted so as to be partly overlapped with the counter weight 20. The mass of the small-capacity battery 30a is smaller than the mass of the normal battery 30. Therefore, when the small-capacity battery 30a is mounted on the same battery powered forklift 1 instead of the normal battery 30, it is likely that the small-capacity battery 30a cannot sufficiently function as a part of the counter weight 20.

In order to solve this problem, it is considered that a weight is added to the small-capacity battery 30a to attain the mass equal to the mass of the normal battery 30, for example. However, adding the weight entails an increase in the number of members. The mass of the small-capacity battery 30a increases more than necessary upon increasing the mass of the battery 30a, unless the position of the center of gravity of the body 10 of the battery powered forklift 1 is considered. In the present embodiment, the battery case 31a of the small-capacity battery is supposed to have the structure described below.

In the present embodiment, a part of the side 51a of the small-capacity battery case 31a has the mass larger than that of the other parts. Specifically, the mass of the back side 51Ba facing the front when the battery 30a is mounted on the battery powered forklift 1 is larger than the masses of the other parts of the side 51a, which are the front side 51Fa, the left side 51La, and the right side 51Ra. In this comparison, the mass Mb of the back side 51Ba, and any one of the mass Mf of the front side 51Fa, the mass Ml of the left side 51La, and the mass Mr of the right side 51Ra are to be compared. In the present embodiment, Mb>Mf, Mb>Ml, and Mb>Mr are established.

In the present embodiment, the back side 51Ba, the front side 51Fa, the left side 51La, and the right side 51Ra are made of the same material. Therefore, the thickness tb of the back side 51Ba is larger than the thickness tf, tl, and tr of the front side 51Fa, the left side 51La, and the right side 51Ra, which are the other parts. According to the structure described above, the mass of the back side 51Ba of the small-capacity battery case 31a is larger than the mass of the other parts. In the normal battery case 31 illustrated in FIG. 8, the thicknesses tf, tb, tl, and tr of the side 51 are the same for all sides. In the present embodiment, in the small-capacity battery 30a, plural battery cells 32a are stored to be close to the rear of the battery case 31a, specifically, stored to be close to the back side 51Ba, as illustrated in FIG. 10. Accordingly, the plural storage sections 52a storing the respective battery cells 32a are formed to be close to the rear of the battery case 31a, specifically, formed to be close to the back side 51Ba. The rear of the battery case 31a means a part of the side 51a having the mass larger than the mass of the other parts.

With this structure, the position of the center of gravity G of the small-capacity battery case 31a and the battery 30a is located posterior to the central part C (the position from a front side 40Fa and a back side 40Ba by Ly/2 in FIG. 11) in the longitudinal direction, i.e., is located on the rear when the small-capacity battery 30a is mounted on the battery powered forklift 1, as illustrated in FIG. 10. The normal battery 30 has the center of gravity on the central part C in the longitudinal direction, and the small-capacity battery 30a having the same outer dimension has the center of gravity G posterior to the center of gravity of the normal battery 30.

Although the mass of the small-capacity battery 30a is smaller than the mass of the normal battery 30, the function of the small-capacity battery 30a as a part of the counter weight 20 can be made equal to or higher than that of the normal battery 30, depending upon the position of the center of gravity G of the small-capacity battery 30a. If the function as the part of the counter weight 20 is equivalent to that of the normal battery 30, the mass of the small-capacity battery 30a can be reduced. In the present embodiment, the mass of each of the batteries 30 and 30a is the total of the battery cases 31 and 31a, all battery cells 32 and 32a, and the spacers 53.

When the small-capacity battery 30a is mounted on the battery powered forklift 1, the back side 51Ba having a large mass is arranged on the position posterior to and separated from the center of gravity Gb of the body 10 illustrated in FIG. 11. When the weight having the same mass is mounted on the battery 30a, the function as the part of the counter weight 20 can effectively be exhibited by mounting the weight on the position posterior to the center of gravity Gb of the body 10 and far away from the center of gravity Gb. In the present embodiment, the mass of the back side 51Ba, which is on the most posterior position from the center of gravity Gb of the body 10, of the battery case 31a is larger than the mass of the other parts, whereby the battery 30a can effectively exhibit the function as a part of the counter weight 20.

As described above, in the small-capacity battery case 31a, the mass of the portion located on the most posterior position when the battery case 31a is mounted on the battery powered forklift 1 is larger than the mass of the other parts in the present embodiment. Since the small-capacity battery 30a has the battery case 31a described above, the position of the center of gravity G is posterior to the center in the longitudinal direction. Therefore, the battery 30a can effectively exhibit the function as the part of the counter weight 20. Specifically, the mass of the small-capacity battery 30a and its battery case 31a is different from (smaller than) the mass of the normal battery, with the result that affect given to the mass balance of the overall battery powered forklift 1 can be reduced. Only the thickness of the back side 51Ba of the small-capacity battery case 31a is increased, so that it is unnecessary to add a weight. As a result, the small-capacity battery 30a and its battery case 31a can reduce an affect given to the mass balance of the overall battery powered forklift 1, while reducing the increase in the number of components.

As illustrated in FIG. 10, lifting hooks 54A and 54B for lifting the battery 30a are provided on the side 51a. In this embodiment, the lifting hook 54A is provided on the front part of the left side 51La in the side 51a, while the lifting hook 54B is provided on the rear part. The right side 51Ra not illustrated in FIG. 10 has the same structure.

As described above, the center of gravity G is located posterior to the central part C in the longitudinal direction in the small-capacity battery 30a. Therefore, when the lifting hooks 54A and 54B are provided on four corners of the battery case 31a, having a square shape in the planar view, for lifting the battery 30a with the wire W, the battery 30a is likely to tilt in the air. Accordingly, as illustrated in FIG. 10, plural lifting hooks 54A and 54B used for lifting up the battery 30a are provided close to a part of the side 51a, i.e., close to the back side 51Ba. This structure can allow the wire W for lifting up the battery 30a to pass through the center of gravity G of the battery 30a. Consequently, as illustrated in FIG. 11, this structure can prevent the tilt of the battery 30a upon lifting up the battery 30a, whereby the small-capacity battery 30a can be exchanged like the normal battery 30.

Figure 12:
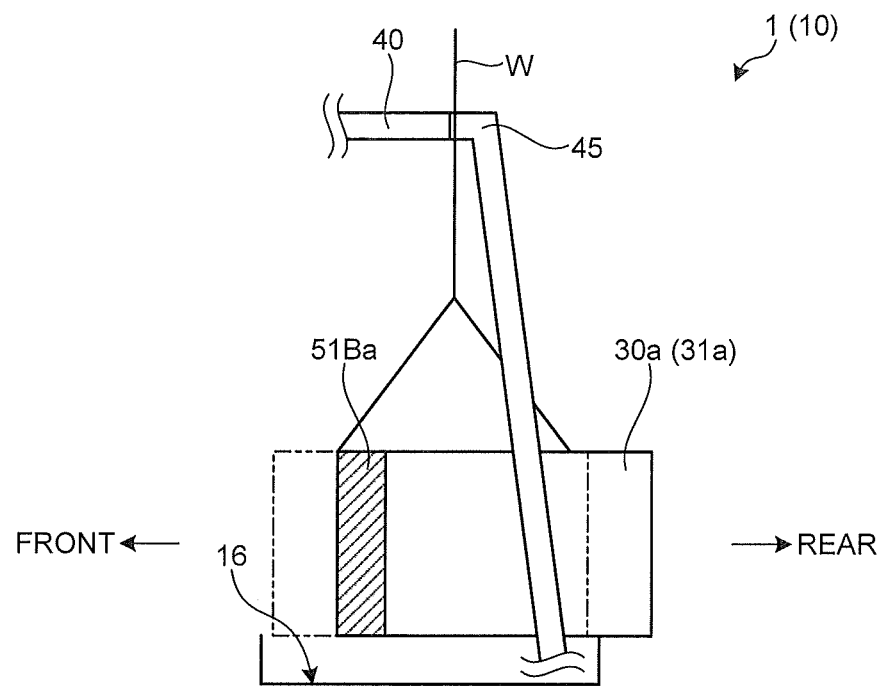
FIG. 12 is a view illustrating a positional relationship between the battery and the battery case according to the embodiment of the present invention and the battery powered forklift.
Figure 13:
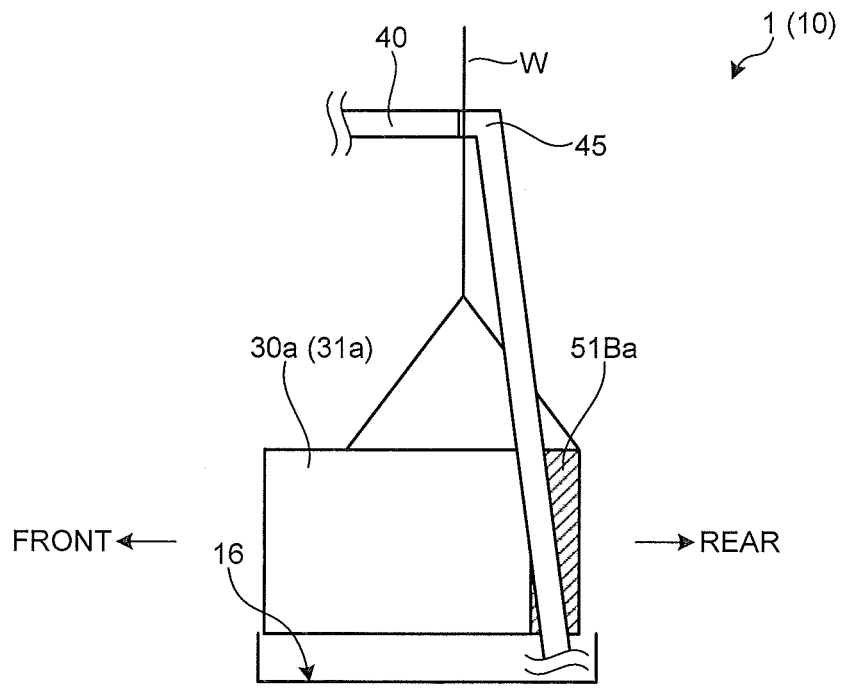
FIG. 13 is a view illustrating a positional relationship between the battery and the battery case according to the embodiment of the present invention and the battery powered forklift.

FIGS. 12 and 13 are views illustrating a positional relationship between the battery and the battery case according to the embodiment of the present invention and the battery powered forklift. When the battery case 31a is mounted on the body 10, the battery case 31a might be mounted back to front. As described above, in the small-capacity battery 30a and the battery case 31a, the lifting hooks 54A and 54B are provided close to the back side 51Ba. Therefore, the wire W passes through the back side 51Ba that is posterior to the central part C in the longitudinal direction as illustrated in FIG. 10.

As illustrated in FIGS. 12 and 13, the battery powered forklift 1 has the slit 45 on the top plate 40 in the present embodiment. Since the wire W passes through the slit 45, the interference between the top plate 40 and the wire W can be avoided, when the battery 30a is mounted on the battery mounting surface 16. The length of the slit 45 in the longitudinal direction is set such that, when the battery case 31a is to be erroneously mounted back to front, i.e., the battery case 31a is to be mounted on the body 10 with the back side 51Ba facing forward, the wire W and the slit 45 interfere with each other. As illustrated in FIG. 13, the length of the slit 45 in the longitudinal direction is set such that, when the battery case 31a is to be mounted on the body 10 with the back side 51Ba facing rearward, the wire W and the slit 45 do not interfere with each other.

According to this structure, when the operator tries to erroneously mount the battery case 31a on the battery mounting surface 16 of the body 10 back to front, the operator cannot move the battery case 31a to the mounting position of the battery mounting surface 16 due to the insufficient length of the slit 45. As a result, the possibility of the erroneous mounting of the battery 30a can be prevented.

In the present embodiment, the thickness of the back side 51Ba is larger than the thicknesses of the other sides of the battery case 31a of the small-capacity battery 30a, in order to increase the mass of the back side 51Ba more than the mass of the other sides. Consequently, the increase in the number of components can be prevented, and the small-capacity battery 30a can effectively exhibit the function as the part of the counter weight 20. In order to increase the mass of the back side 51Ba more than the mass of the other sides, the material having higher density than the material for the other sides may be used for the back side 51Ba, and the thicknesses of all sides 51a may be made equal. The thickness of the bottom 50a near the back side 51Ba of the battery case 31a may be larger than the thickness of the bottom 50a near the front side 51Fa.

In the present embodiment, the battery case 31a is used for the battery powered forklift 1. However, the subject to which the battery case 31a is applied is not limited thereto. The battery case 31a is well adaptable to a battery powered work equipment whose mass in any direction is intended to increase. In the present embodiment, the mass of the back side 51Ba of the battery case 31a increases in order to increase the mass of the rear part of the battery powered forklift 1. However, the portion, having the increased mass, of the battery case 31a is different according to the specification of the work equipment to which the battery case 31a is applied.

In the battery case 31a, the mass of a part of the side 51a is larger than the mass of the other parts. Therefore, the battery case 31a is only mounted in such a manner that the portion having the increased mass faces the portion of the work equipment whose mass is intended to increase. For example, in the case of the work equipment that intends to increase the mass of the front part, the mass of the front side 51Fa of the battery case 31a is set to be larger than the mass of the other sides. Alternatively, the battery case 31a in which the mass of the back side 51Ba is larger than the mass of the other sides may be mounted in such a manner that the back side 51Ba faces the front of the work equipment.

While certain embodiments have been described, these embodiments are not intended to limit the scope of the inventions. Further, it should be noted that components described herein may be replaced with other components that are obvious to those skilled in the art and are substantially equal, i.e., are equivalent. Further, the components described above may be combined on an optional basis. Various omissions, substitutions and changes in the form of the embodiments described herein may be made without departing from the spirit of the embodiments.

REFERENCE SIGNS LIST

1 BATTERY POWERED FORKLIFT
2 DRIVING ELECTRIC MOTOR
10 BODY
13 FORK
14 MAST
16 BATTERY MOUNTING SURFACE
20 COUNTER WEIGHT
30, 30a BATTERY
31, 31a BATTERY CASE
32, 32a BATTERY CELL
33a SUPPORT SHAFT
34 DRIVER SEAT
35 SUPPORT BRACKET
40 TOP PLATE
45 SLIT
50, 50a BOTTOM
51, 51a SIDE
51R, 51Ra RIGHT SIDE
51B, 51Ba BACK SIDE
51L, 51La LEFT SIDE
51F, 51Fa FRONT SIDE
52, 52a STORAGE SECTION
53 SPACER
54A, 54B LIFTING HOOK
W WIRE

The invention claimed is:

1. A work equipment battery case that stores battery cells for driving a battery powered work equipment, the work equipment battery case comprising:
   a plate-shaped bottom plate on which the battery cells are placed; and
   a front side plate, a back side plate, a left side plate, and a right side plate projected from the bottom plate,
   wherein the front side plate, the back side plate, the left side plate, and the right side plate are made of a same material, and a mass of the back side plate is larger than each mass of the front side, the left side, and the right side plates, and
   wherein the battery case further comprises spacers, each of which being formed between the front side plate and the battery cells, between the left side plate and the battery cells, and between the right side plate and the battery cells.

2. The work equipment battery case according to claim 1, wherein the battery case comprises plural storage sections each of which stores each battery cell, and the plural storage sections are gathered adjacent to the back side plate.

3. The work equipment battery case according to claim 1, wherein a thickness of the back side plate is larger than each of the front side, the left side, and the right side plates.

4. The work equipment battery case according to claim 1, wherein plural lifting hooks are mounted on the left side plate and the right side plate to be close to the back side plate.

5. A work equipment battery unit that drives a battery powered work equipment, the work equipment battery unit comprising:
   battery cells; and
   a battery case,
   wherein the battery case includes a plate-shaped bottom on which the battery cells are placed and a front side plate, a back side plate, a left side plate, and a right side plate projected from the bottom plate, the front side plate, the back side plate, the left side plate, and the right side plate are made of a same material, and a mass of the back side plate is larger than each mass of the front side, the left side, and the right side plates, and the battery cells are gathered adjacent to the back side plate, and wherein the battery case further comprises spacers each of which being formed between the front side plate and the battery cells, between the left side plate and the battery cells, and between the right side plate and the battery cells.

6. The work equipment battery unit according to claim 5, wherein a thickness of the back side plate is larger than each of the front side plate, the left side plate, and the right side plate.

7. The work equipment battery unit according to claim 5, wherein plural lifting hooks are mounted on the left side plate and the right side plate to be closer to the back side plate than the front side plate.

8. A battery powered work equipment comprising the work equipment battery unit according to claim 5.

9. A battery powered forklift comprising
a fork mounted on a front of a body of the forklift,
a counter weight mounted on a rear of the body, and
a top plate arranged on a position for covering a portion above a driver seat via a pair of rear stays extending upward from left and right sides at the rear of the body, wherein
the battery powered forklift is driven by electric power from a battery mounted on the body,
a battery case is mounted on the body on a position above a rear wheel so as to be capable of being unloaded toward the rear of the body,
the battery includes:
battery cells; and
the battery case comprising: a plate-shaped bottom on which the battery cells are placed; and a front side plate, a back side plate, a left side plate, and a right side plate projected from the bottom plate, the front side plate, the back side plate, the left side plate, and the right side plate are made of a same material, and the battery cells are gathered adjacent to the back side plate, and
wherein the battery case further comprises spacers each of which being formed between the front side plate and the battery cells, between the left side plate and the battery cells, and between the right side plate and the battery cells.

10. The battery powered forklift according to claim 9, wherein plural lifting hooks are mounted on the left side plate and the right side plate to be close to the back side plate.

11. The battery powered forklift according to claim 10, wherein the top plate has a slit which is formed along a longitudinal direction of the body, and opens to a rear end.

12. The battery powered forklift according to claim 9, wherein a thickness of the back side plate is larger than each of the front side plate, the left side plate, and the right side plate.

* * * * *